United States Patent [19]
Mori

[11] Patent Number: 5,541,740
[45] Date of Patent: Jul. 30, 1996

[54] IMAGE PROCESSING APPARATUS

[75] Inventor: Mikihiro Mori, Kanagawa, Japan

[73] Assignee: Fuji Xerox Co., Ltd., Tokyo, Japan

[21] Appl. No.: 881,338

[22] Filed: May 11, 1992

[30] Foreign Application Priority Data

May 14, 1991 [JP] Japan .................. 3-109183

[51] Int. Cl.⁶ .................. H04N 1/40; H04N 1/38
[52] U.S. Cl. .................. 358/447; 358/445; 358/464
[58] Field of Search .................. 358/448, 455, 358/456, 459, 461, 462, 464, 447, 445, 443, 296, 298; 346/108, 160

[56] References Cited

U.S. PATENT DOCUMENTS

| | | | |
|---|---|---|---|
| 3,813,486 | 5/1974 | Knowles | 178/7.1 |
| 4,763,199 | 8/1988 | Suzuki | 358/280 |
| 4,782,398 | 11/1988 | Mita | 358/280 |
| 4,800,442 | 1/1989 | Riseman | 358/280 |
| 4,979,032 | 12/1990 | Alessi et al. | 358/527 |

FOREIGN PATENT DOCUMENTS

| | | |
|---|---|---|
| 62-181575 | 8/1987 | Japan . |
| 62-183669 | 8/1987 | Japan . |
| 62-183670 | 8/1987 | Japan . |
| 3-110972 | 5/1991 | Japan . |

*Primary Examiner*—Edward L. Coles, Sr.
*Assistant Examiner*—Allan A. Esposo
*Attorney, Agent, or Firm*—Finnegan, Henderson, Farabow, Garrett & Dunner, L.L.P.

[57] ABSTRACT

In an image processing apparatus, digital video data is converted into analog video data by a D/A converter. A reference pattern timing-adjusted is generated. The phase relationship between the reference pattern and the analog video data is optimized. The analog video data and the reference pattern are compared by comparing unit. A pulse-width modulated signal output from the comparing unit is detected. The variable output regulator is controlled according to a preset reference value, a quantity of laser light of the output device, or a surface potential of the photoreceptor. Through the control of the regulator, the quantity of bias applied to the reference pattern is optimized at all times, providing a pulse-width modulated image signal with an excellent tone reproduction at all times.

1 Claim, 10 Drawing Sheets

IMAGE PROCESSING APPARATUS

BACKGROUND OF THE INVENTION

1. Field of the Invention

The present invention relates to an image processing apparatus, and more particularly to an image processing apparatus which compares in level an analog image signal with a reference pattern signal recurring at predetermined periods, and produces a pulse-width modulated binary-coded image signal through the comparison.

2. Description of the Prior Art

An image processing apparatus, such as a laser printer, has been known as a means for forming a half-tone image. In the apparatus an input digital image signal is converted into an analog image signal, the analog image signal is compared with a periodic analog pattern signal, such as a triangle-wave signal, and a pulse-width modulated binary-coded image signal is produced through the comparison.

In producing a pulse-width modulated pulse signal through the comparison of the analog video data with the reference pattern to be compared, a phase relationship between the analog video data and the reference pattern frequently changes depending on a quantity of delay of each signal system. In this case, the output pulse width varies, and the pulse width nonlinearly varies according to the level of the analog video data signal. The resultant tone expression performance is unsatisfactory.

In another prior art (as disclosed in Unexamined Japanese Patent Publication Sho-62-181575), a bias level for the analog pattern signal is set so as to secure the maximum resolution and a linearity over the full scale in a manner that, by adjusting, for example, a quantity of bias applied to the triangle-wave, the maximum level of the analog video signal is set to be equal to the peak level of a triangle-wave signal, and the minimum level of the analog video signal is set to be equal to the bottom level of the triangle-wave signal. In the prior art, the characteristics of analog parts, such as resistors and capacitors, which make up a triangle-wave generator, vary due to temperature variation, for example, and consequently the bias level varies. Thus, it is difficult to set up an optimum bias level.

SUMMARY OF THE INVENTION

The present invention has been made in view of the above circumstances and has an object to provide an image processing apparatus which properly adjusts the phase relationship between the analog video signal and the reference pattern signal, and sets the bias level for the reference pattern to an optimum value at all times, whereby providing a pulse-width modulated output signal of an excellent tone reproduction performance.

According to the present invention, there is provided an image processing apparatus having a D/A converter for converting digital video data, which corresponds to an optical density in an image, into analog signals, a reference pattern generating unit for generating a reference pattern signal, and a comparing unit for comparing analog video data, which results from the D/A conversion by the D/A converter, with the reference pattern signal, thereby generating a pulse-width modulated binary-coded image signal, wherein the reference pattern generating unit generates the reference pattern signal corrected according to the output characteristic of the image output terminal.

In the image processing apparatus as mentioned above, the reference pattern generating unit includes a triangle-wave generating circuit for generating a triangle-wave signal forming the base of the reference pattern. The reference pattern generating unit of the image processing apparatus further includes correcting unit for making the top or bottom of triangle wave blunt in shape. The correcting unit of the reference pattern generating unit includes a CR circuit containing a capacitor and a resistor. In the CR circuit, the time constant of the capacitor when it is charged is different from that of the capacitor when it is discharged. The image processing apparatus further includes clock signal generating unit for generating a clock signal for supply to the D/A converter and the reference pattern generating unit, and timing adjusting unit for adjusting the timing of the application of the clock signal from the clock signal generating unit to the D/A converter.

In the image processing apparatus thus arranged, the digital video data is converted into analog video data by the D/A converter. A reference pattern signal is generated in synchronism with a video clock signal. The analog data and the reference pattern signal are compared by the comparing unit. In this case, the phase relationship of the reference pattern signal with the analog video data is optimized by synchronizing the reference pattern signal with the video clock signal timing-adjusted. The bias control unit detects the pulse-width modulated signal output from the comparing unit, and produces an output signal which depends on a predetermined reference value, a quantity of laser light of the output device, or a surface potential of the photoreceptor. The output signal of the bias control unit controls a variable output regulator to provide an optimum level of the bias applied to the reference pattern signal at all times. Accordingly, the image processing apparatus of the invention can produce a pulse-width modulated signal of good tone reproduction.

DETAILED DESCRIPTION OF THE PREFERRED EMBODIMENTS

Figure 1:
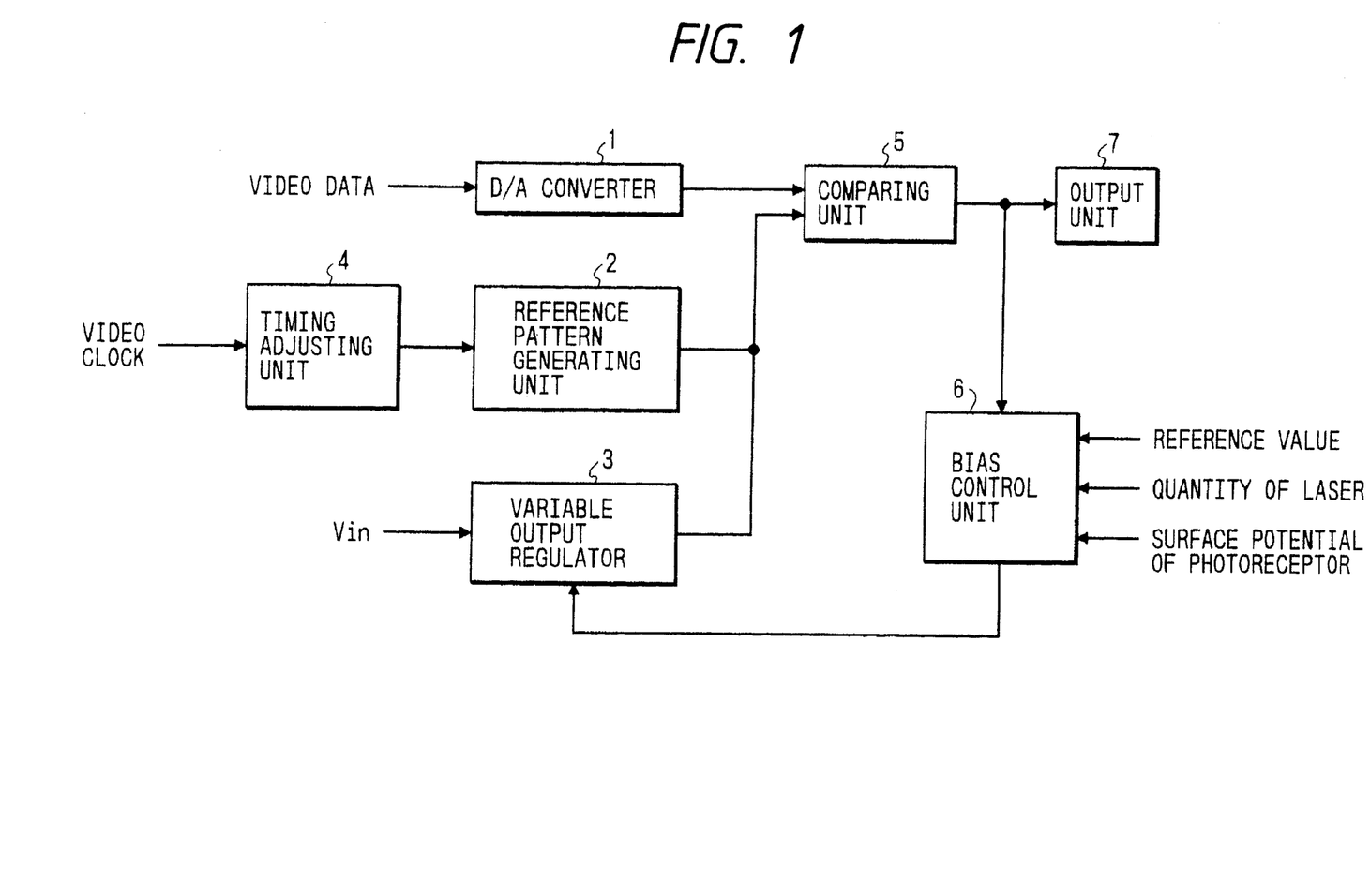
FIG. 1 is a block diagram functionally showing an overall arrangement of an image processing apparatus according to the present invention.
Figure 2:
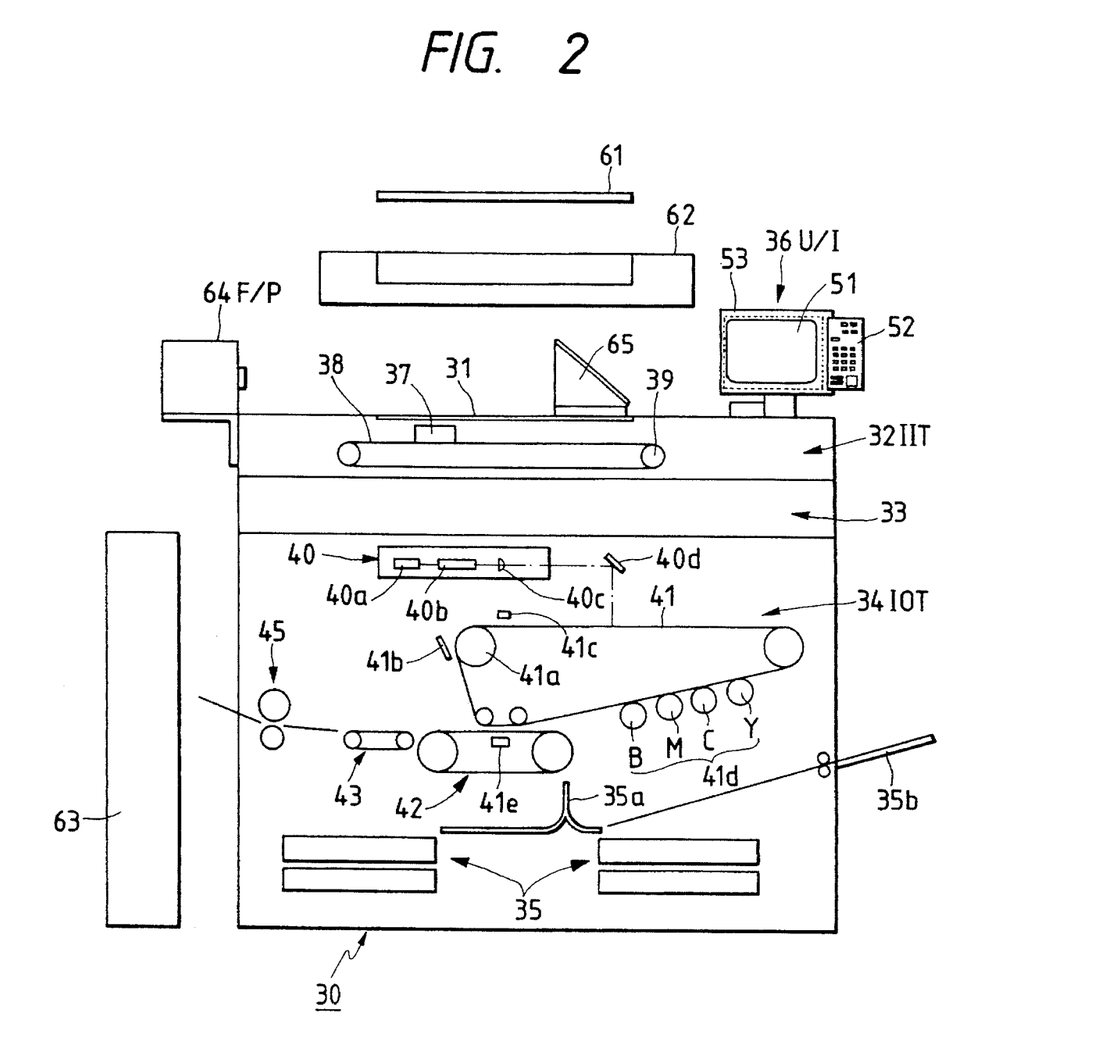
FIG. 2 is a diagrammatic view showing the construction of a copying machine to which the image processing apparatus of the invention is applied.
Figure 3:
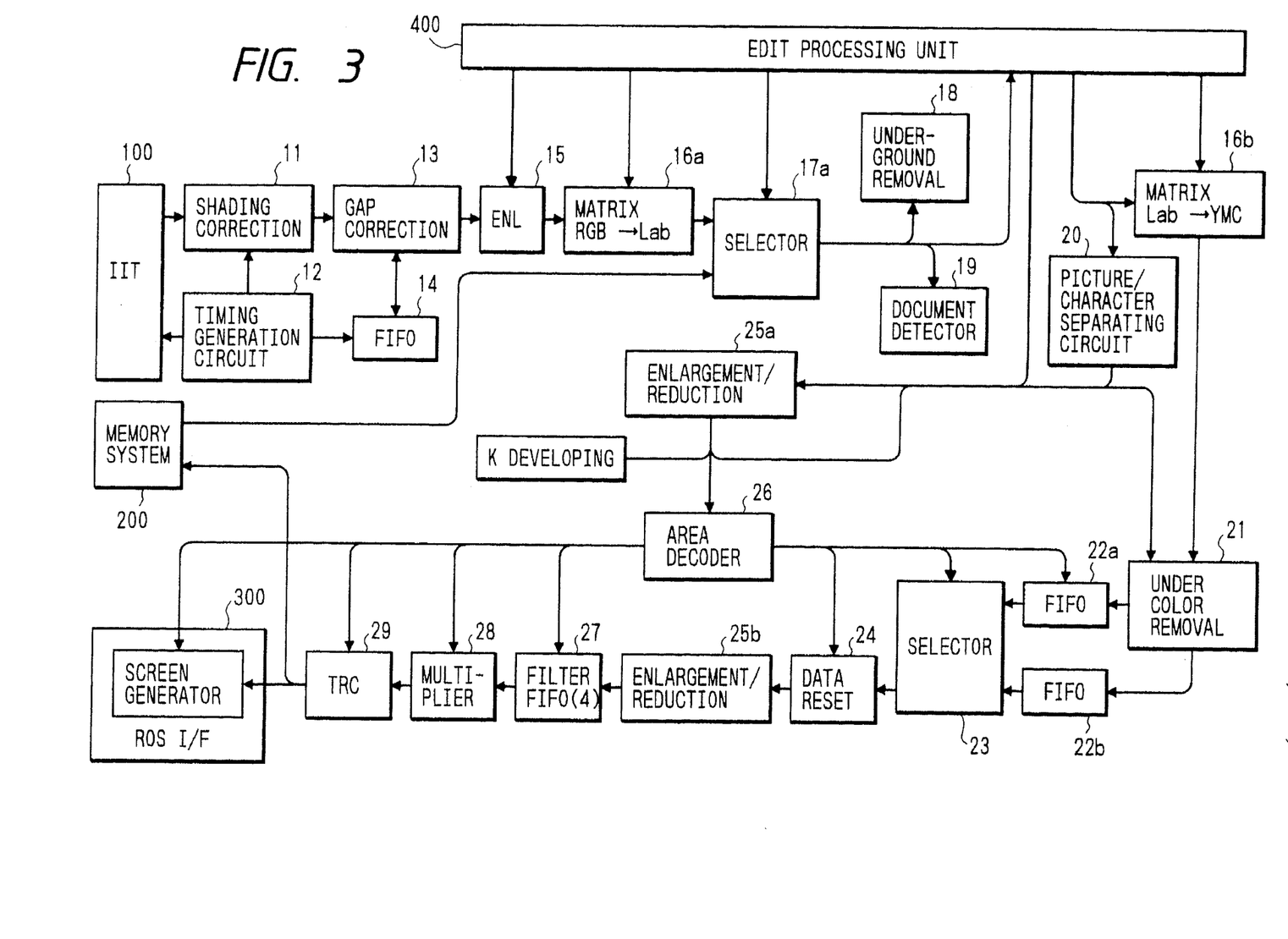
FIG. 3 is a block diagram functionally showing an image processing circuit.
Figure 4:
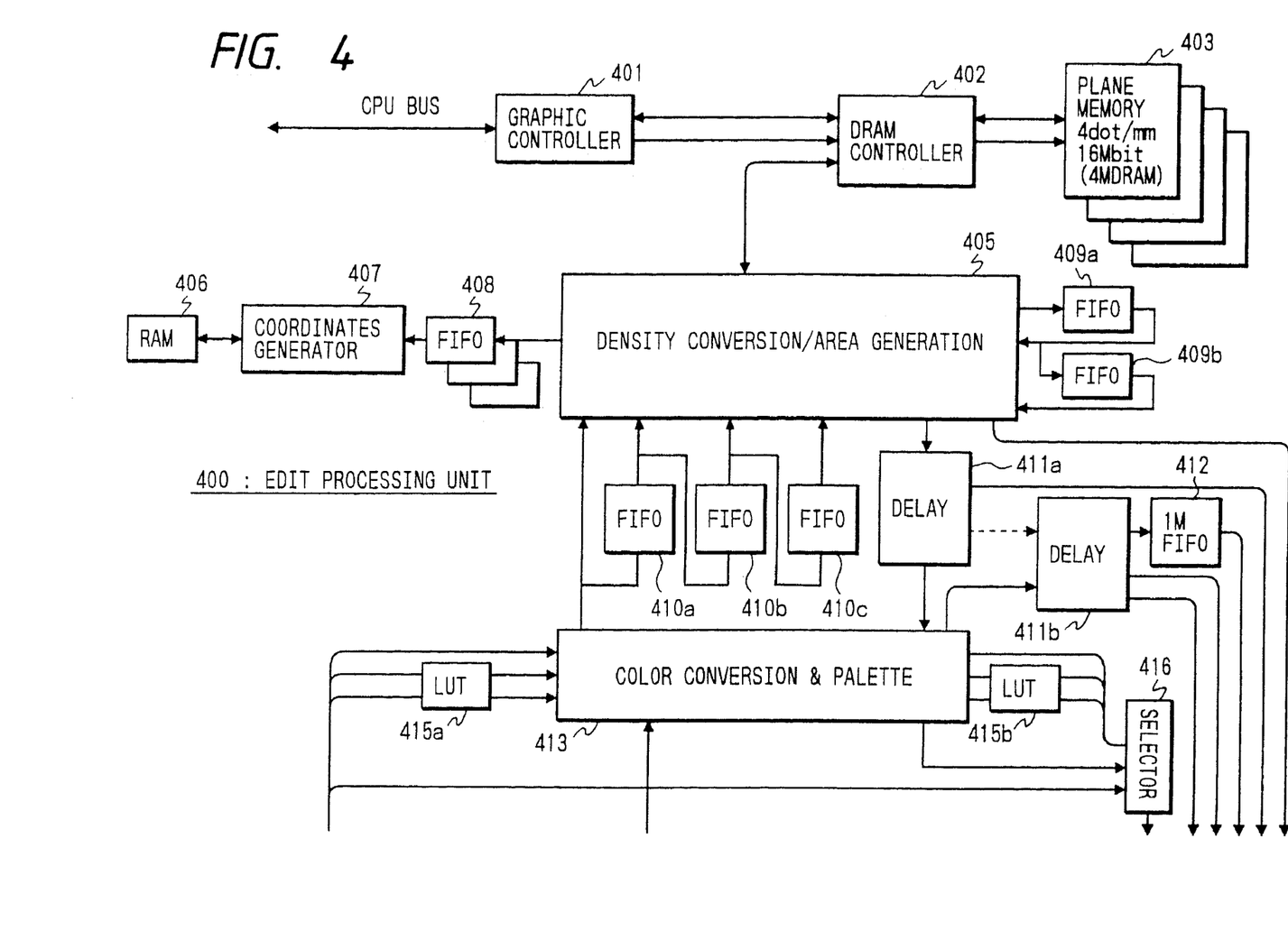
FIG. 4 is a block diagram functionally showing a color edit processing unit.

FIG. 1 is a block diagram functionally showing an arrangement of an image processing apparatus according to the present invention. FIG. 2 is a diagrammatic view showing the construction of a copying machine to which the image processing apparatus of the invention is applied. FIG. 3 is a block diagram showing the processing of read image data. FIG. 4 is a block diagram showing a color edit processing unit.

The present invention will be described in brief with reference to FIGS. 2 through 4.

FIG. 2 is a diagrammatic view showing the overall construction of a color copying machine with a film image reader.

In the color copying machine shown in FIG. 2, a base machine 30 is made up of a platen glass 31 on which an original document is placed, an image input terminal (IIT) 32, an electric-control-board container 33, an image output terminal (IOT) 34, a paper tray 35, and a user interface (U/I) 36. The color copying machine is optionally provided with an edit pad 61, an automatic document feeder (ADF) 62, a sorter 63, and a film image reader having a filter projector (F/P) 64 and a mirror unit (M/U) 65.

The IIT 32 includes an imaging unit 37, a wire 38 for driving the imaging unit 37, drive pulleys 39, and the like. In the IIT 32, a color image on a color original document is separated into three primary colors B (blue), G (green), and R (red) by color filters within the imaging unit 37, and is read by a CCD line sensor. The image data thus obtained is converted into multi-tone digital image signals B, G and R, and output to an image processing system. The image processing system, contained in the electric-control-board container 33, receives B, G and R image signals, applies various types of conversions and correction processings to those image signals to improve image quality, such as colors, tone and definition, and reproduction performances, and performs additional edit processings of the color image data. Further, the image processing system converts the image colors into the toner primary colors Y (yellow), M (magenta), C (cyan), and K (black), converts tone toner signals of the process colors into on/off or binary-coded signals, and outputs those converted signals to the IOT (image output terminal) 34. The IOT 34 includes a scanner 40, and a photoreceptor belt 41, the image signals are converted into optical image signals by a laser output unit 40a. The optical image signals are imaged, in the form of a latent electrostatic image corresponding to the original color image, on the photoreceptor belt 41 through the combination of a polygonal mirror 40b, an F/8 lens 40c, and a reflection mirror 40d. The thus formed color image is transferred onto a paper supplied from the paper tray 35, and is output in the form of a color copy.

In the IOT 34, the photoreceptor belt 41 is driven by a drive pulley 41a. A cleaner 41b, a charger 41c, Y, M, C and K developing units 41d, and a transfer unit 41e are located around the photoreceptor belt 41. A transfer device 42 is further provided in opposite to the transfer unit 41e. The transfer device 42 nips a recording paper supplied through a paper transfer path 35a from the paper tray 35, and is rotated four times (in the case of 4-color full copy) to transfer Y, M, C and K latent images on the paper. The paper bearing the four latent images is forwarded through a vacuum transfer unit 43 to a fusing unit 45. After the latent images are fused and fixed on the recording paper, the paper is discharged outside. An SSI (single sheet inserter) 35b allows a user to manually and selectively supply a recording paper into the paper transfer path 35a.

The U/I (user interface) 36 allows the user to select desired functions and to instruct the conditions to execute the functions. The U/I 36 is provided with a color display 51 and a control panel 52. Additional use of an infrared touch board 53 enables the user to directly enter instructions with touch buttons on the screen.

The electric-control-board container 33 contains a plurality of control boards for the IIT 32, IOT 34, U/I 36, image processing system, film projector 64, and the like, an MCB board (machine control board) for controlling the operations of the IOT 34, ADF 62, sorter 63, and the like, and an SYS board for controlling all those units.

FIG. 3 is a block diagram showing an arrangement for processing image data read by the IIT.

An image input terminal (IIT) 100 contains a size-reduction type sensor which consists of three line sensors of R, G and B arrayed perpendicular to the sub-scanning direction. The IIT 100 performs a scanning operation in synchronism with a timing signal from a timing generating circuit 12. The read image data is shading-corrected by a shading correction circuit 11, and applied to a gap correction circuit 13 where gaps among the line sensors are corrected. In the gap correction, the read image data is delayed by the quantities corresponding to the gaps by an FIFO (First-In-First-Out Structure Line Memory) 14 so that the R, G, and B image signals of the same position are obtained at the same time. An ENL (equivalent neutral lightness) 15 is provided for effecting a gray balance. The setting of gray levels in the image signal is inverted every pixel, viz., the negative/positive inversion is performed, by a negative/positive inverting signal from an edit processing unit 400 to be given later. The ENL 15 may selectively make the negative/positive inversion in only a specific image area. The R, G and B image signals gray-balanced are converted into L, a and b image signals in a matrix circuit 16a according to control signals from the edit processing unit 400 (it is evident that L*, a*, and b* as the standardized L, a and b may be used in place of L, a and b). Of these signals L, a, and b, the signal L indicates a lightness and the signals a, and b indicate a chromaticity plane (hue and saturation) in the coordinates system having three coordinate axes. The conversion of the image signal from R, G and B to L, a and b is performed in order to gain an easy interface with other devices, such as computers. A selector 17a, controlled by a signal from the edit processing unit 400, selects either the output signal of the matrix circuit 16a or the image data from a memory system 200 as an interface with an external computer. An undercolor removal circuit 18, which stores the lowest and highest densities on the original through the prescan, removes the pixels having densities lower than a predetermined density, thereby to improve the copy quality of fog-contained documents like news paper. A document detector 19 detects the boundary of the dark part of the platen, whereby it detects the size of an original document irrespective of position where the original is placed, if it is oriented exactly in the scanning direction. The L, a and b image signals color-edited by the edit processing unit 400 are converted into Y, M and C toner color image signals in another matrix circuit 16b. In an under color removal circuit (UCR) 21, a black (K) signal is generated and thus Y, M, C, and K color signals are generated. At the same time, the image signals color-edited are applied to a picture/character separating circuit 20 which then decides whether or not the content of the image data is color character, black character or a picture pattern. In the UCR 21, according to character data or a picture pattern, a hue signal and process color signals Y, M, C and K are temporarily stored into FIFOs 22a and 22b. Those signals are selectively read out of the FIFOs by another selector 23. When the image data is black characters, a data reset circuit 24 resets the color data of Y, M and C. When the image data is color characters or a picture pattern, it allows the image data to pass therethrough as intact. An enlargement/reduction circuit 25a is provided in order to keep relative positions of a color edit area and a normal copy area during the reduction or enlargement process. The enlargement/reduction data is decoded by an area decoder 26 and supplied to respective processing portions. The image data reduced or enlarged by another enlargement/reduction circuit 25b is passed through a filter 27. In the filter, the image data is subjected to the processings for moire removal and edge emphasis. In a multiplier 28, the coefficients of the respective color components are properly selected to adjust colors and densities of color and black characters, and picture patterns. A TRC 29 is provided for adjusting the density according to the characteristic of the IOT. The image data is stored in a memory system 200 or output in the form of an image in a ROS (Raster Output Scanner) 300. The ROS means an exposure system including a laser, laser driver and a polygon mirror.

FIG. 4 is a block diagram showing the overall arrangement for edit-processing the image data.

The edit processing unit 400 is provided for color edit and area generation. In an LUT 415a, the chromaticity data is transformed from the data a and b in the orthogonal coordinates system to the data C and H in the polar coordinates system. This is done for providing easy detection of marker and other colors, and rendering easy the color edit, color change and the like. Further, the image data of 24 bits is converted into the image data of 20 bits in order to reduce the memory capacity of a color conversion & palette 413. In the color conversion & palette 413, colors used for color edit are contained in 32 types of palettes. Only the image data in an area in which the color conversion is made is input to the color conversion/palette 413. The image data in the remaining area is transferred directly to a selector 416 and then to the matrix circuit 16b. The color converted L, C and H image data signals are converted again, by an LUT 415b, into L, a and b image signals, and returned to the 24-bit image data which in turn is transferred to the selector 416. Marker color signals (of three colors) and a closed area signal of 4 bits, that are output from the color conversion & palette 413, are transferred to a density conversion/area generating circuit 405. At this time, by using FIFOs 410a, 410b and 410c, with a 4×4 window, the image data is binarized in such a manner that black pixels more than a predetermined number are contained in the sixteen (16) pixels, "1" is assigned to the image data. Through the binarizing processing, the image density is converted from 400 spi (spot per inch) to 100 spi. Marker signals (of closed loop and marker dots) thus generated in the density conversion/area generating circuit 405 are stored into a plane memory 403. In order to not mistake dusty particles as the marker, the marker dot signal is delayed by the quantity of nine (9) lines by a FIFO 408. With a 9×9 window, marker dots are detected, and the coordinates of the marker dots are generated and stored into a RAM 406. It is to prevent the mistaken detection that the marker dot signals, which are also stored into the plane memory, are thus processed.

The plane memory 403 is provided for generating an area when the color edit is performed. The area may also be written from an edit pad, for example. To be more specific, coordinates data specified on the edit pad is transferred through a CPU bus to a graphic controller 401. With the aid of an address signal from the graphic controller 401, the area is written into the plane memory 403 through a DRAM controller 402. The plate memory 403 consists of four (4) memory planes. Sixteen (16) types, 0 to 15, of areas can be generated by reading the area simultaneously from the four plane memories.

In reading the data from the plane memory 403, in order to prevent a closed loop curve being zig-zagged in shape, the density conversion/area generating circuit 405 delays the image data by the quantity of four lines by FIFOs 409a and 409b, and converts the image density from 100 spi to 400 spi through a data interpolation. The color edited data is time-adjusted, by delay circuits 411a and 411b, and a 1MFIFO, with respect to the image data that is read in the IIT.

The image processing apparatus of the present invention will be described.

The present invention is concerned with the ROS I/F 300 shown in FIG. 3. As shown in FIG. 1, digital video data is converted into analog video data by a D/A converter 1. A video clock signal is adjusted in timing by timing adjusting Unit 4. In synchronism with the adjusted clock signal, reference pattern generating unit 12 generates a reference pattern, such as a triangle-wave signal. Comparing unit 5 compares the analog signal and the reference pattern signal to produce pulse-width modulated, binary-coded image data. A bias voltage, which is output from a Variable output regulator 3, is coupled with the reference pattern signal, thereby to adjust the phase relationship of the reference pattern signal with the analog video signal to be compared. Further, the pulse-modulated signal output from the comparing unit is detected by a bias control unit. With the detected signal, the variable output regulator 3 is controlled to adjust the bias level. Finally, an optimum phase relationship between the analog video data and the reference pattern signal is set. Also according to a quantity of laser light output from the output device or a surface potential of the photoreceptor, the bias control unit controls the variable output regulator to provide an optimum level of the bias voltage to be coupled with the reference-pattern signal at all times.

Figure 5:
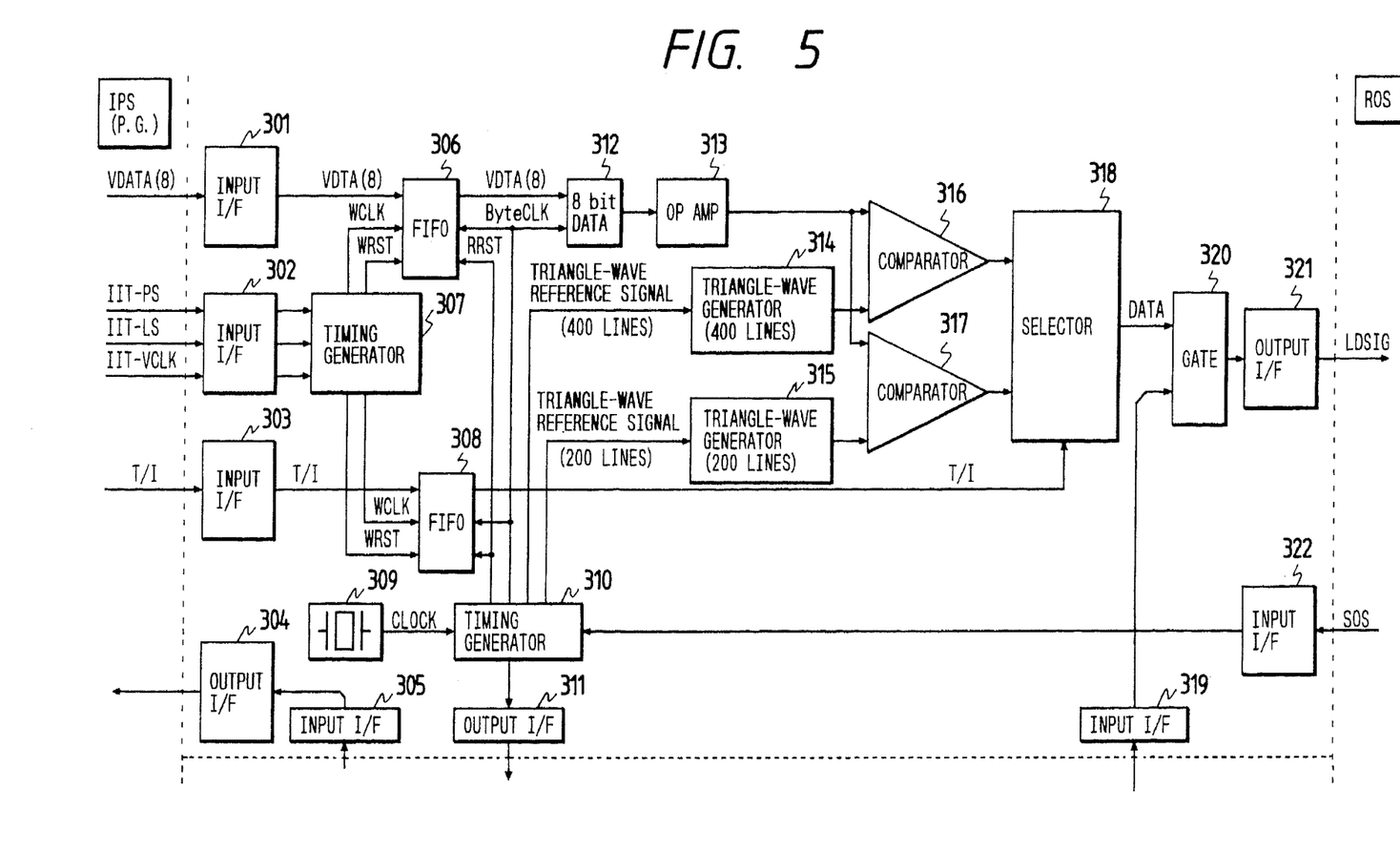
FIG. 5 is a block diagram showing a ROS I/F block in the image processing circuit.

The D/A converter 1 shown in FIG. 1 corresponds to a D/A converter 312 shown in FIG. 5. The reference pattern generating unit 2 corresponds to triangle-wave generators 314 and 315. The comparing unit 5 corresponds to comparators 316 and 317. The circuit arrangement of FIG. 5 will be described.

FIG. 5 is a block diagram showing the details of the ROS I/F 300 in FIG. 3.

In FIG. 5, 8-bit video data from the TRC is loaded into a FIFO 306, through an input I/F 301. The loading of the video data into the FIFO 306 is timed by clock signals WCLK and WRST derived from a timing generator 307, which receives a vertical sync signal IIT-PS, a horizontal sync signal IIT-LS, and a video clock signal (IIT-VCLK) from the IPS, through an input I/F 302. The video data loaded is read out of the FIFO, while being timed by a byte clock signal and an RRST signal, which are generated by another timing generator 310 driven by an internal clock 309. The video data read from the FIFO is applied to an 8-bit D/A converter 312 where it is converted into analog data. The analog data is applied through an operational amplifier 313 to the first input terminals of the comparators 316 and 317.

Figure 6A:
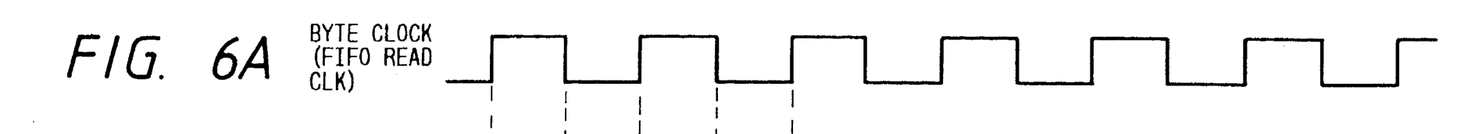
FIGS. 6A–6D is a waveform diagram showing 200-line and 400-line triangle-waves in connection with byte-clock and video data signals.
Figure 6B:
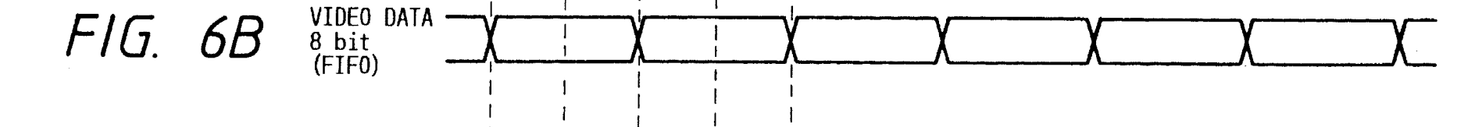
Figure 6C:
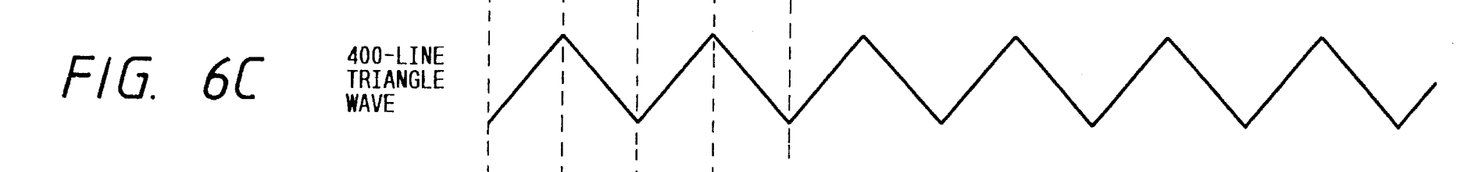
Figure 6D:
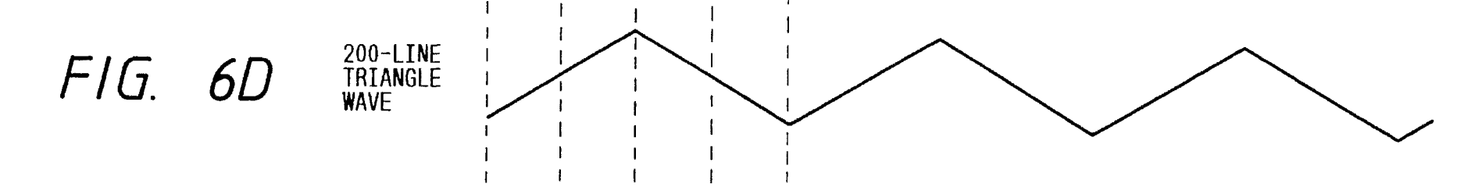

In response to a triangle-wave reference signal from the timing generator 310, the triangle-wave generator (400 lines) 314 and the triangle-wave generator (200 lines) 315 generate reference triangle-wave signals, which are applied to the second input terminals of the comparators 316 and 317. In synchronism with 8-bit video data (FIG. 6B), which is read out of the FIFO 306 in synchronism with a byte clock signal (FIG. 6A), the triangle-wave generators 314 and 315 generate respectively a 400-line triangle-wave signal (FIG. 6C) at the same period of that of the byte clock, and a 200-line triangle-wave signal (FIG. 6D) at the ½ period of that of the byte clock. In this way, line screens of 400 lines and 200 lines are generated.

In this way, the analog video data and the triangle-wave signals are applied to the comparators 316 and 317, so that the comparators generate pulse signals having the pulse widths, which depend on the size of the analog video data. The output pulse signals of the comparators are applied to the selector 318.

A T/I bit signal (character signal) from the area decoder shown in FIG. 3 is applied as a select signal to the selector 318. The character signal is applied to an input I/F 303, and is then loaded into a FIFO 308 in synchronism with a video clock signal. The character signal is read out of the FIFO at the timing of the internal clock signal, and applied to the selector, which allows the output signal of the comparator 316 or the Comparator 317 to selectively pass therethrough. In the case of characters, for example, the 400-line triangle-wave signal is selected for providing a clear contour. In the case of photograph, for example, the 200-line triangle-wave signal is selected for avoiding the edge emphasis. A gate signal, which is derived from an IOT controller (not shown), is applied through an input I/F 319 to a gate circuit 320, and is output as a laser driver signal LSDIG through a gate 320 and an output I/F 321. The horizontal sync signal SOS supplied from the IOT controller is applied through an input I/F 322 to the timing generator 310, thereby synchronizing the video clock signal. The sync signal from the IOT controller is output to the IIT through an input I/F 305 and an output I/F 304. It synchronizes the line sink with the IOT and outputs a scan sync signal to the IIT.

Figure 7A:
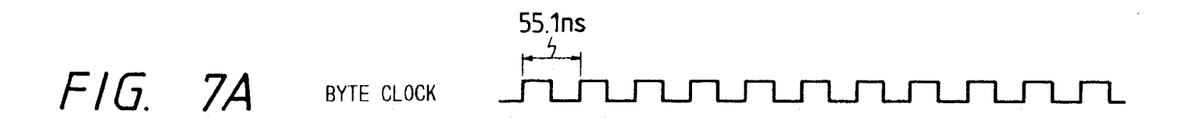
FIGS. 7A–7H is a waveform diagram useful in explaining how a pulse-width modulation is performed.
Figure 7B:
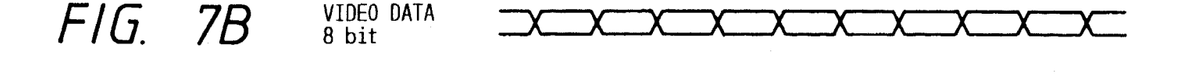
Figure 7C:
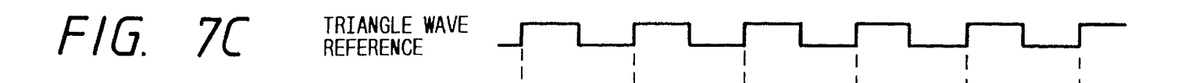
Figure 7D:
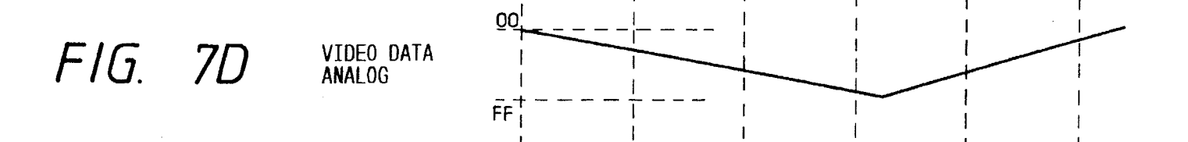
Figure 7E:
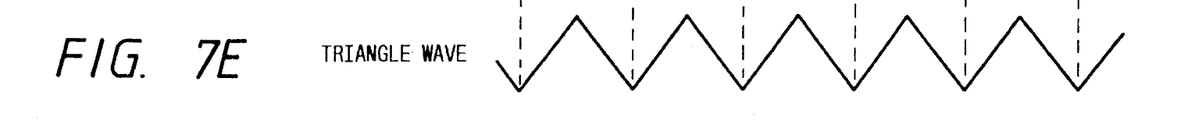
Figure 7F:
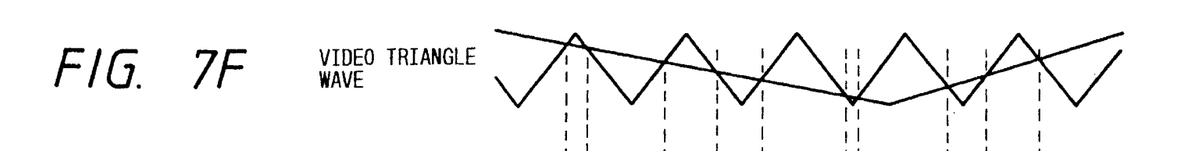
Figure 7G:
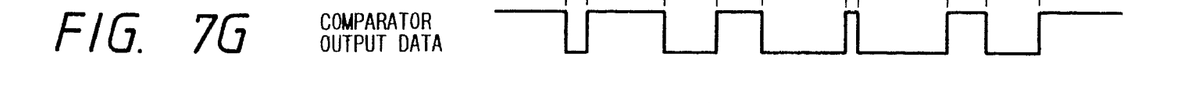
Figure 7H:
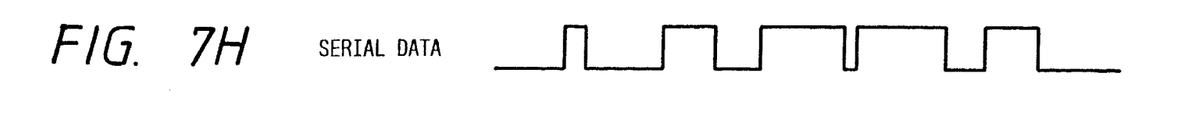

The operation of the comparing unit 5 shown in FIG. 1, viz., the comparators in FIG. 5. When the comparator receives a byte clock signal and a video data signal as shown in FIGS. 7A and 7B, the comparator generates a triangle-wave signal as shown in FIG. 7C. In synchronism with this, it generates a triangle-wave signal as shown in FIG. 7E. Analog video data shown in FIG. 7D and the triangle wave are compared as shown in FIG. 7F. In the comparison, "1" is assigned to a portion where the video data is larger than the triangle-wave, while "0" is assigned to a portion where the video data is smaller than the triangle-wave. As a result, the comparator produces a pulse-width modulated signal. At the same time, the comparator produces a serial data signal, which is out of phase with respect to the comparator output data, as shown in FIG. 7H.

Figure 8A:
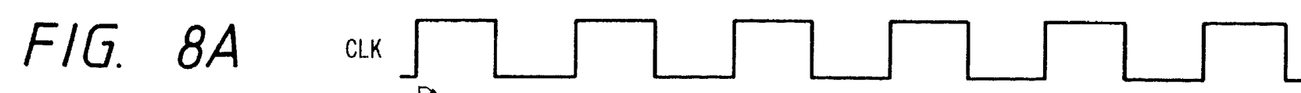
FIGS. 8A–8F is a waveform diagram showing a relationship of an output pulse with the phases of the video data signal and the triangle-wave.
Figure 8B:
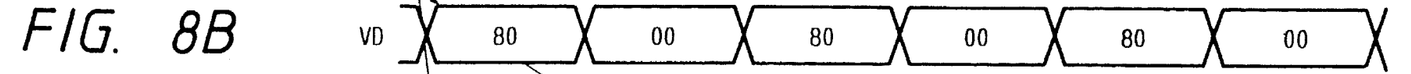
Figure 8C:
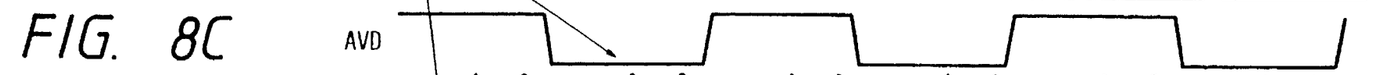
Figure 8D:
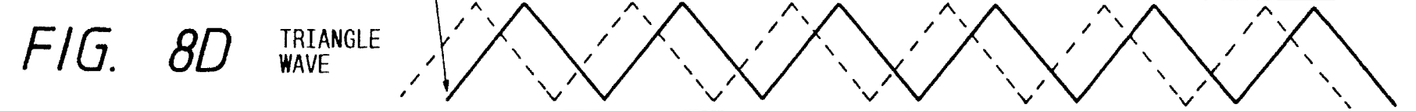
Figure 8E:
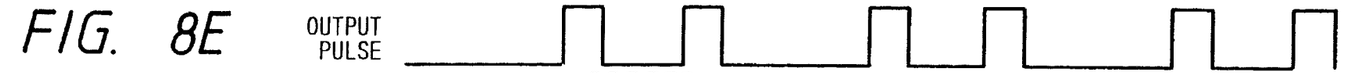
Figure 8F:
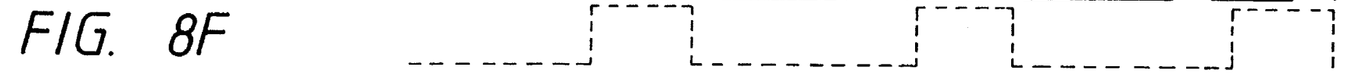

In a case where the clock signal and the video data are as shown in FIGS. 8A and 8B, the analog video data is delayed by a predetermined time as shown in FIG. 8C. The triangle-wave is also delayed by another predetermined time with respect to the clock signal, as shown. Usually, the delay of the analog video data signal is larger than that of the triangle-wave signal. In the case of a triangle-wave as indicated by a broken line shown in FIG. 8D, the pulse width linearly varies with respect to the analog video data level as shown in FIG. 8F. When the triangle-wave signal is phase-shifted as indicated by a solid line in FIG. 8D, the output pulse signal is separated into two pulses for the portion of the video data corresponding to the period of one clock as shown in FIG. 8E. When observing only one pulse width, the pulse width nonlinearly varies from OO to FF with respect to the analog video data. The laser of the output device, which responds to the pulse, cannot follow up the pulse if its width is extremely narrow. As a result, the printer will fail to print the portions of an image where the optical density is low.

To cope with this, as shown in FIG. 1, the present invention employs the timing adjusting unit 4 to adjust the quantity of delay of the video clock signal, thereby to set up the optimum phase relationship between the reference pattern generated by the reference pattern generating unit 2 and the video data output from the D/A converter.

Figure 9:
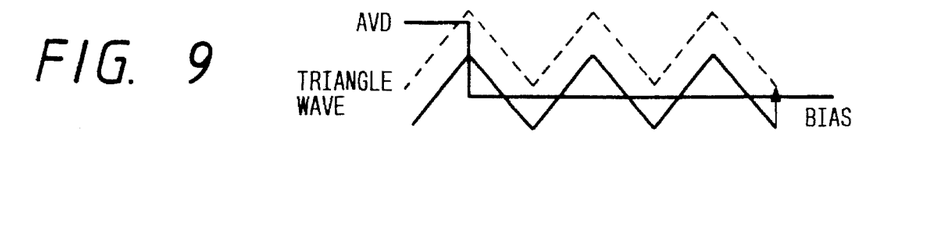
FIG. 9 is a waveform diagram for diagrammatically explaining the bias adjustment of the triangle-wave.

The bias quantity of the triangle-wave signal varies due to temperature variation, as shown in FIG. 9. Conventionally, the output pulse width-is adjusted- using a variable resistor, for example, when the board is detected. For this reason, the pulse width adjusting method suffers from the problems of nonuniformity of part constants, and complicated adjusting method, and the like. In the present invention, as shown in FIG. 1, the output pulse width is detected by the bias control unit 6. With the detected pulse width, the variable regulator 3 is controlled, thereby to control the bias quantity, and consequently to gain the optimum pulse width. In the bias control unit 6, a reference value is set by a CPU, not shown. The bias control, which is for providing the optimum pulse width, depends on the information, such as the quantity of laser light, and the surface potential of the photoreceptor.

Figure 10:
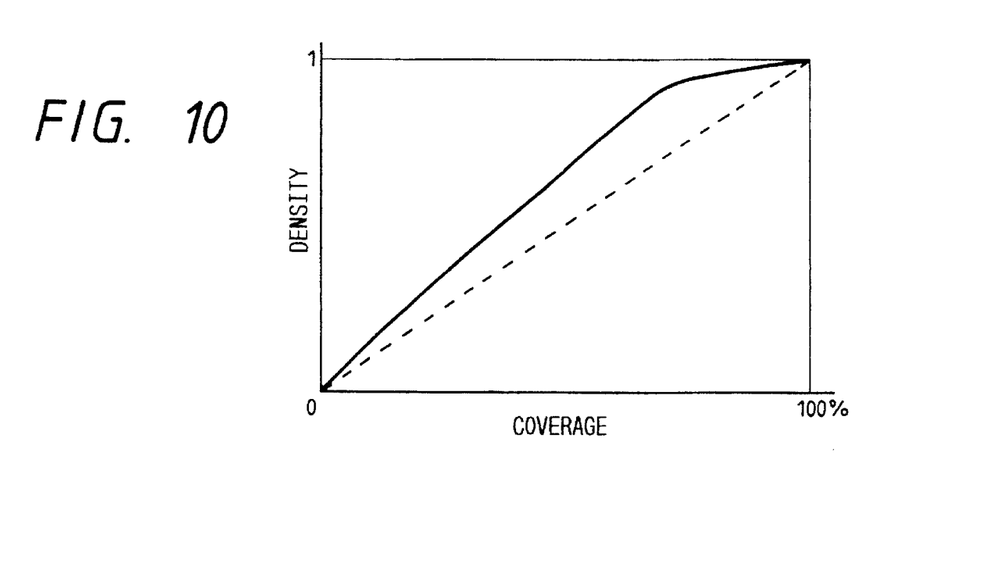
FIG. 10 is a graph showing a density vs. coverage relationship.
Figure 11A:
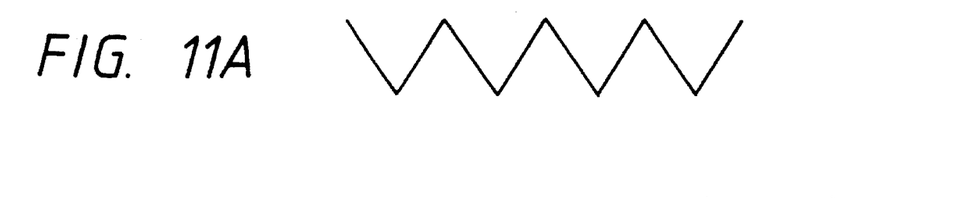
FIG. 11A and 11B is a waveform diagram for explaining a triangle-wave used in the invention.

As seen from a graph showing a density characteristic, in which the abscissa represents the coverage (%) and the ordinate represents the optical density, the density nonlinearly increases with respect to the coverage. Particularly in the region of large coverage, the nonlinearity is remarkable. The reference pattern generating unit 2 in FIG. 1 is designed such that for example, in a normal triangle-wave as shown in FIG. 11A, a top A (FIG. 11B), which corresponds to a high-light (bright) portion of an image, has an acute angle, and a bottom B, which corresponds to a dark portion, has an obtuse angle. A small change of the video data, which is to be compared with the triangle-wave having the blunt bottom B, leads to a large change of the pulse-width. Therefore, an increased density change can be secured in the large coverage region. As a consequence, the density characteristic can be corrected to have a linear curve as indicated by a broken line in FIG. 10.

Figure 11B:
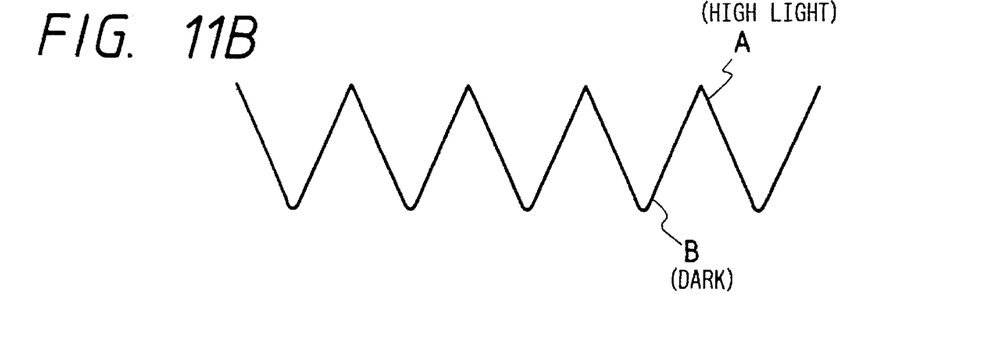
Figure 12:
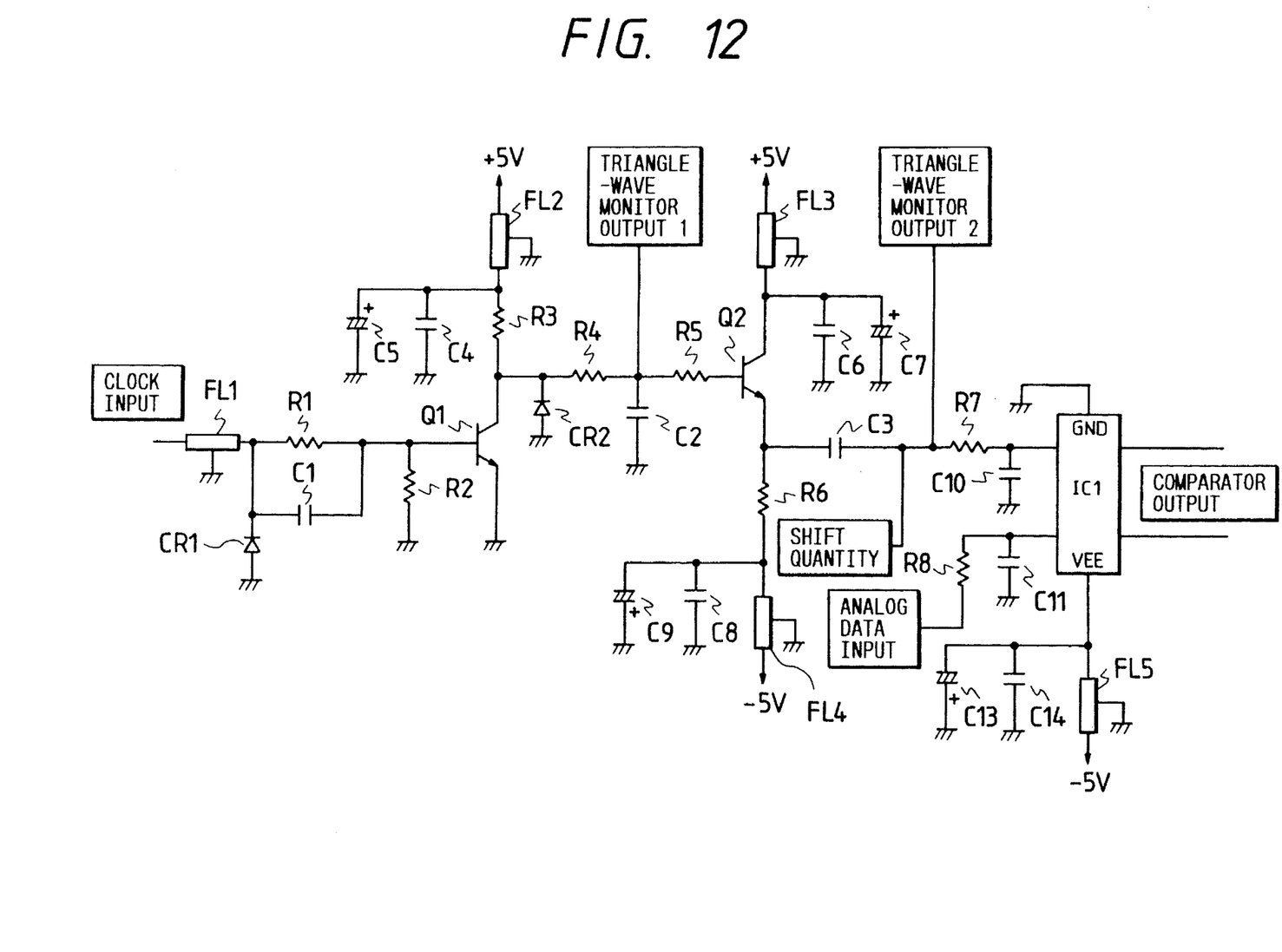
FIG. 12 is a circuit diagram showing a triangle-wave signal generator used in the present invention.

The triangle-wave as shown in FIG. 11B may be generated by a circuit shown in FIG. 12. In the circuit, a transistor Q1 is turned on and off by a clock-signal input thereto. In an off state, a capacitor C2 is charged by a +5 V source, through. resistors R3 and R4. In an on state, the capacitor C2 is discharged through the resistor R4. The time constant of this circuit when it is charged is different from that when it is discharged. -The time constant at the time of discharge is large, and that at the time of charge is small. Accordingly, the triangle-wave as shown in FIG. 11B is generated. The triangle-wave signal travels through a buffer transistor Q2. The DC component of the triangle wave signal is removed by a capacitor C3. The signal emanating from the capacitor is superposed with a signal representing a quantity of bias shift. Then, the signal is applied toga comparator IC1, through a ringing-noise removal circuit consisting of a resistor R7 and a capacitor C10. The comparator, which also receives an analog data signal, produces an output signal pulse-width modulated.

As seen from the foregoing description, in the image processing apparatus of the invention, the phase adjustment is made between the video data and the reference pattern, and the bias adjustment is made according to the pulse-width modulated signal. These adjustments improve the tone expression performance, and provide a stable output of an image. It is further noted that the top or bottom of the triangle-wave, which corresponds to the dark portion of the image, is made blunt in shape according to the $C_{in}/D_{out}$ (coverage/output density) characteristic. The technical feature realizes a tone expression, which is in harmony with the IOT characteristic.

What is claimed is:

1. An image processing apparatus comprising:

digital-to-analog converting means for converting digital video data, which corresponds to an optical density in an image, into analog signals;

reference pattern generating means for generating a reference pattern signal, wherein said reference pattern generating means includes a triangle-wave generating circuit for generating a triangle-wave signal forming a base of the reference pattern, and correcting means for making the top or bottom of the triangular wave blunt in shape without affecting a positive or negative peak value of the triangle wave; and comparing means for comparing analog video data, which results for the D/A conversion by said D/A converter, with the reference pattern signal, thereby generating a pulse-width modulated binary-code image signal;

wherein said pattern generating means adjusts the reference pattern signal based on a relationship between the analog video data and a density of the pulse-width modulated binary-coded image signal.

* * * * *